June 9, 1925.
W. J. FONE
1,540,935
POWER TAKE-OFF MECHANISM
Filed March 27, 1922 2 Sheets-Sheet 1
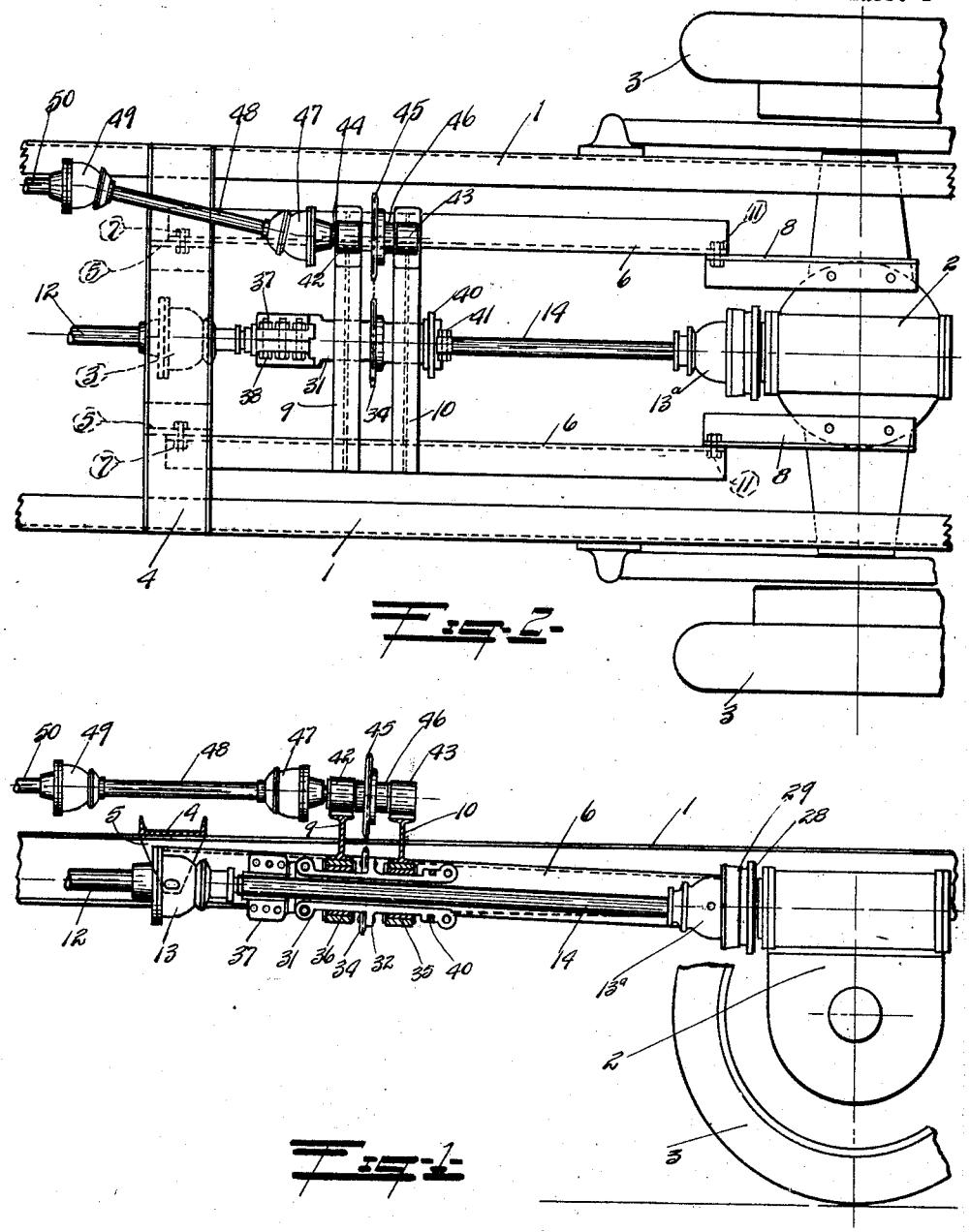
Inventor
William J. Fone.
By
Frank C. Farman.
Attorney June 9, 1925.
W. J. FONE
1,540,935
POWER TAKE-OFF MECHANISM
Filed March 27, 1922    2 Sheets-Sheet 2
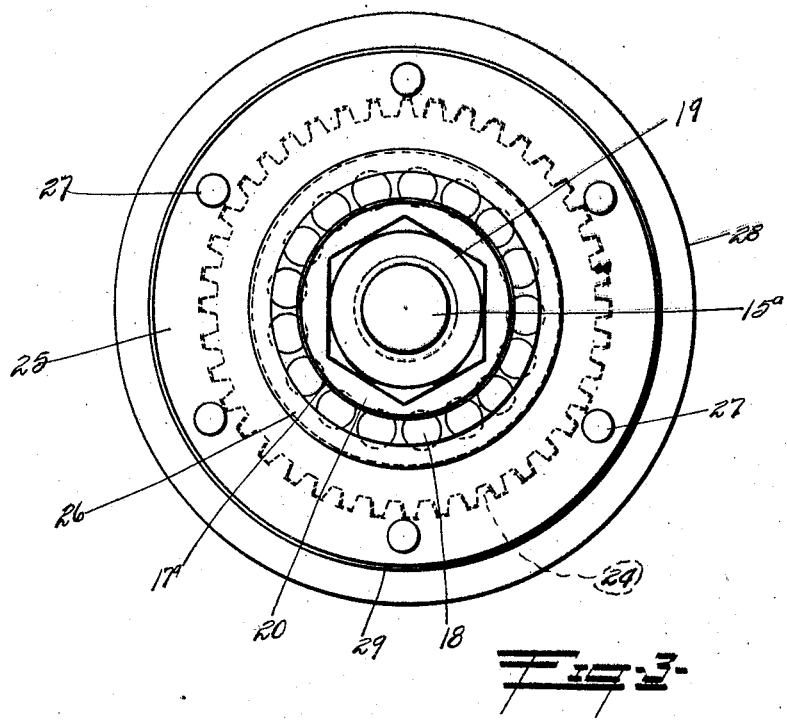
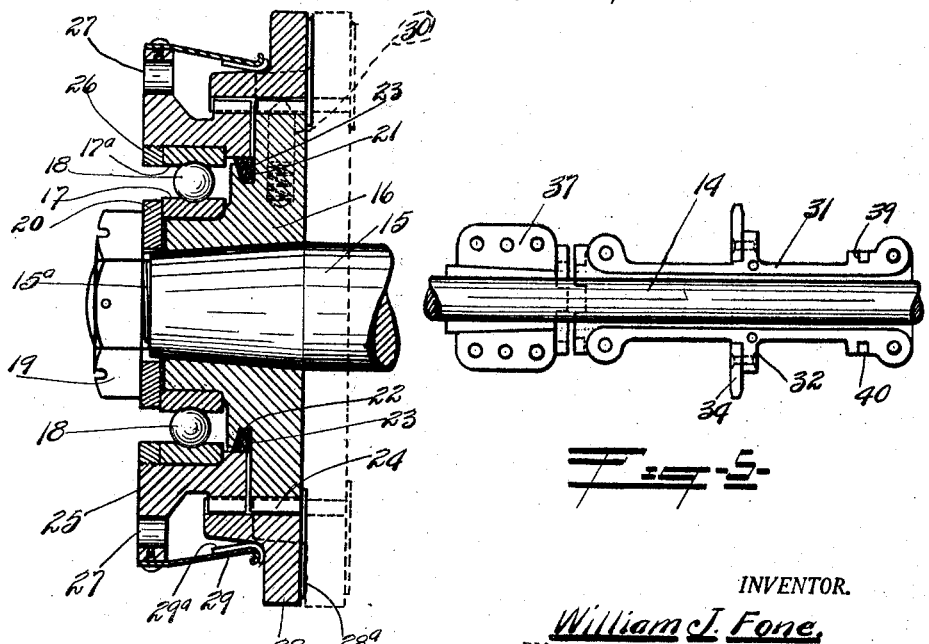
INVENTOR.
William J. Fone,
BY
Frank C. Farman
ATTORNEY.

Patented June 9, 1925.

1,540,935

UNITED STATES PATENT OFFICE.

WILLIAM J. FONE, OF BAY CITY, MICHIGAN, ASSIGNOR TO THE BAY CITY FOUNDRY & MACHINE COMPANY, OF BAY CITY, MICHIGAN.

POWER TAKE-OFF MECHANISM.

Application filed March 27, 1922. Serial No. 547,249.

*To all whom it may concern:*

Be it known that I, WILLIAM J. FONE, a citizen of the United States of America, and a resident of Bay City, in the county of Bay and State of Michigan, have invented certain new and useful Improvements in Power Take-Off Mechanism, of which the following is a specification.

This invention relates to a power take-off mechanism such as applied to motor trucks and the like.

The first and prime object of the invention is to design a power take-off on which all of the speeds of the transmission can be secured in order to be able to pull light loads rapidly and heavy loads slowly.

Another object is to design a power take-off mechanism which can be applied to any standard truck after it is in the purchaser's hands irrespective of the transmission installed and without necessitating extensive changes and labor.

A further object is to provide a power take-off mechanism which can be reversed for lowering heavy loads thus using the engine as a brake.

A further object still is to design a power take-off which can be easily and quickly installed, and by means of which a winch mechanism mounted on the truck can be driven without driving the vehicle wheels.

The above and other objects will appear as the specification progresses, reference being had to the accompanying drawings in which like reference numerals indicate like parts throughout the several views thereof.

In the drawings:—

Fig. 1 is a fragmentary sectional side view of a truck chassis illustrating my improved power take-off mechanism applied thereto.

Fig. 2 is a top plan view thereof.

Fig. 3 is a front end view of the declutching mechanism.

Fig. 4 is a cross sectional view thereof, and

Fig. 5 is an enlarged view of one section of the sleeve and clutch mechanism.

In general practise motor trucks are provided with a transmission having four speeds, viz; low, intermediate, high and reverse. There are at present a number of power-take-off mechanisms on the market, but these are connected directly to the transmission, being usually designed and applied at the factory, and are special with each make of truck. Also different makes of transmissions are installed in the various trucks, and it is difficult to design a standard power take-off which can be attached to these various makes of transmissions. I have therefore designed a power takeoff which can be connected to the standard vehicle drive shaft, and provide means whereby the drive shaft may be disconnected from the rear axle, and means for engaging and disengaging the driving mechanism or drive shaft from the winch driving means.

Referring now particularly to the drawings, the numeral 1 indicates a conventional motor truck frame which is mounted on the vehicle rear axle 2 in the usual manner, ground engaging wheels 3 being journaled thereon as shown.

A cross member 4 is rigidly secured to the side members comprising the frame 1, and a pair of angle clips 5 are secured thereto by means of rivets or the like, one leg projecting downwardly as shown, and a pair of longitudinally extending members 6 are pivotally connected to the said leg by means of the bolts 7, the opposite end of the said members being connected to a pair of supports 8 which are rigidly secured to the rear axle housing by bolts or in any other approved manner.

The longitudinally extending members 6 are secured together by means of the transversely disposed members 9 and 10 and form a rigid unit or frame, pivoted at the front end by the bolts 7 and at the rear by the bolt members 11 in the same manner.

The drive shaft extends longitudinally in the frame, and transmits power from the vehicle engine to the rear axle, one end of a jack shaft 12 is connected to the vehicle transmission (not shown) the opposite end being secured to a universal joint 13 which is located in direct horizontal alinement with the pivoting point 7 of the frame. One end of the drive shaft 14 is connected to this universal joint 13 in the usual manner, the opposite end being secured to one end of a similar universal joint 13ᵃ. These universals are made up in two halves and are formed with flanges for bolting them together, and in applying my improved power take-off I discard one part of the universal, retaining the portion whch permits of the angular adjustment of the drive shaft and substitute a declutching mechanism for the discarded portion, securing it to the flange yoke of the universal in the same manner.

In the present installation I have shown a worm drive truck, a worm being mounted on a short shaft 15, and meshing with a worm wheel carried in the rear axle housing, and which in turn transmits motion to the wheels. The end of the shaft 15 is tapered and projects beyond the housing, and my improved declutching mechanism is mounted thereon, and comprises an offset hub member 16 solid on the tapered portion of the shaft 15, the offset portion being turned to receive the ball races 17 and 17ᵃ between which anti-friction balls 18 are carried. A shoulder 15ᵃ is turned on the end of the shaft and is threaded to receive a nut 19, a collar 20 being interposed between the nut and the ball race for holding the ball race in position; another shoulder 21 is turned on this hub 16 and a groove 22 is formed therein and is adapted to receive the wick 23 for preventing a leakage of oil or grease. The outer periphery of this member 16 is formed as a clutch member having a plurality of teeth 24 cut therein for a purpose to be presently described. A hollow flanged member 25 is mounted on the outer ball race 17ᵃ and is recessed to provide a shoulder for the raceway, the outer edge being threaded to receive a similarly threaded retaining ring member 26. Bolt receiving openings 29 are provided in spaced relation in the face of the member 25 for securing it to the flange yoke of the universal joint. A shoulder is formed on the outer periphery of this member 25 and gear teeth are cut therein; these are of the same pitch diameter, and the teeth are identically the same as those cut in the clutch member 16. The inner edge of the member 25 surrounds the shoulder 21, the wick forming a grease tight joint thereat.

An internal gear member 28 surrounds the toothed portions of the members 16 and 25 and is adapted to mesh therewith, this gear being shiftable longitudinally to engage or disengage the toothed portion of the member 25. A dust guard 29 is secured to the flange of the member 25 extending inwardly and embracing the hub of the internal gear 28, the end being turned, and a leather strip 29ᵃ is secured to the free end. This excludes dust, dirt and other foreign matter. Another dust guard 28ᵃ is secured to the outer face of the member 28 for excluding dust from the end.

When the internal gear is in the position as shown in full lines in Fig. 4 this entire mechanism rotates as a unit and transmits motion to the rear axle, but when the internal gear is forced to position as shown in dotted lines in the same figure, the member 16 will be stationary and will not rotate with the drive shaft, thereby disconnecting the drive shaft from the rear axle. Spring actuated pins 30 are seated in suitable recesses formed in this member 16 and are adapted to engage suitable depressions formed in the internal gear to present shifting etc.

A sleeve 31 embraces the forward end of the drive shaft and is formed in two halves or sections to facilitate its attachment to the truck, and is provided with a shoulder 32 intermediate its length and to which a sprocket 34 is bolted. Bearings 35 and 36 are hung from the transversely disposed members 9 and 10 and the sleeve 31 is journaled therein. The front end of this sleeve 31 is formed as a jaw clutch, and is adapted to mesh with a similarly formed member 37 tightly clamped to the vehicle drive shaft. This member is also formed in two halves, being secured together by means of the bolts 38. A groove 39 is formed at one end of this sleeve 31 and a collar or shifting yoke 40 is mounted therein to facilitate the shifting of this sleeve longitudinally on the drive shaft, and consequently shifting the clutch end of the sleeve into and out of engagement with the member 38; thus, when the mechanism is in the position as shown in full lines in Figs. 1 and 2, the clutch is engaged and the sleeve and sprocket will rotate with the drive shaft, but when the sleeve is shifted to the rear as shown in Fig. 5, the clutch will be disengaged and the sleeve will be loose on the drive shaft. Bolts 41 are provided for tightly clamping the sections of the sleeve together.

Bearings 42 and 43 are mounted on the transversely disposed members 9 and 10 and a counter shaft 44 is journaled therein; a sprocket 45 is mounted on this counter shaft between the two bearings and is connected to the sprocket 34 by means of suitable chain, a collar 46 being interposed between the sprocket and bearing as shown. A universal joint 47 connects this counter shaft with an angularly disposed section of shaft 48, and a similar universal 49 is secured on the opposite end of the shaft which is also splined to compensate for any differences in length caused by the raising or lowering of one end of the frame; a section of shaft 50 is secured to the universal 49 and is connected to the winch mechanism (not shown) in any approved manner.

In practise when it is desired to use the power take-off mechanism, the internal gear 28 must first be shifted out of engagement with the member 25 thereby disconnecting the drive shaft from the rear axle, the member 25 rotating on the ball bearing carried on the hub of the member 16. The member 31 is then shifted into engagement with the member 37, which is solid on the drive shaft, thereby locking the drive shaft and the sleeve together and causing the sprocket 34 to rotate therewith; this sprocket in turn transmits motion to the sprocket 45 carried on the counter shaft 44 for driving the winch mechanism.

Any suitable means can be provided for shifting the sleeve on the drive shaft, and various changes may be made in the specific construction as shown without departing from the spirit of my invention.

I wish to direct attention to the fact that the frame moves with the drive shaft; the sleeve is supported by the bearings 35 and 36, while the declutching mechanism is carried on the end of the worm shaft; therefore, the member 38 is the only additional weight carried by the drive shaft in this installation, while the bearings 35 and 36 act as drive shaft bearings.

From the foregoing description it will be obvious that I have perfected a simple and durable power take-off mechanism, comparatively economical to manufacture and which can be applied to any standard truck.

What I claim is:—

1. The combination with a motor vehicle, a drive shaft, a universal joint, a power take off comprising a declutching mechanism solid on the drive shaft and provided with a toothed clutch, a toothed member journaled thereon and adapted to be connected to the universal joint, shiftable means surrounding said member for selectively engaging one or both of said members, a sub-frame connected to the vehicle frame, a counter shaft journaled thereon, and means for driving the counter shaft from the drive shaft.

2. The combination with a motor vehicle, a drive shaft, a clutch mounted thereon, a universal joint, a declutching mechanism for disconnecting the drive shaft from the rear axle, and comprising a clutch member, a driven member journaled thereon and connected to the flange yoke of the universal joint, shiftable means for selectively engaging one or both of said members, a sub-frame pivotally connected to the vehicle frame, a counter shaft journaled thereon, and means for driving the counter shaft from the drive shaft when the clutch is engaged.

3. The combination with a motor vehicle, a drive shaft, a universal joint, a clutching mechanism interposed between the drive shaft and the vehicle rear axle and comprising a toothed clutch, a toothed member journaled thereon and adapted to be connected to the universal joint, shiftable means adapted to selectively engage one or both of said members, a clutch member solid on the drive shaft and rotatable therewith, a sleeve shiftable into engagement with said clutch, a sub-frame for supporting said sleeve, the rear end being pivotally connected to the rear axle housing at the horizontal swiveling center of the rear universal joint, a counter shaft journaled on the sub-frame and means for driving the counter shaft when the sleeve is engaged.

4. The combination with a motor vehicle, of a power take-off comprising a declutching mechanism interposed between the drive shaft and the rear axle, a clutch, a sub-frame pivotally connected to the vehicle frame, the rear end of which is pivotally connected to the rear axle housing at the horizontal swiveling center of the rear universal joint, a counter shaft journaled on the said frame and means for driving the counter shaft from the drive shaft.

5. The combination with a motor vehicle, of a power take-off comprising a declutching mechanism interposed between the drive shaft and the rear axle, a clutch member solid on the drive shaft and rotatable therewith, a sleeve loosely embracing the drive shaft and shiftable into engagement with the said clutch member, a frame pivotally connected to the vehicle frame for supporting said sleeve, the rear end being pivotally connected to the rear axle housing at the horizontal swiveling center of the rear universal joint, a counter shaft journaled on the said frame and means for driving the counter shaft from the drive shaft when the sleeve is engaged.

6. The combination with a motor vehicle, of a power take off mechanism comprising means for disconnecting the drive shaft from the rear axle, a clutch member solid on the drive shaft and rotatable therewith, a sleeve embracing the drive shaft, and means for shifting it into engagement with the clutch member, a sub-frame pivotally connected to the vehicle chassis for supporting the sleeve and being pivoted at the horizontal centers of the swiveling points of the universal joint secured to the ends of the drive shaft, a counter shaft mounted on the sub-frame, and means mounted on the counter shaft and the drive shaft for driving said counter shaft when the sleeve is shifted into engagement with the clutch member.

7. The combination with a motor vehicle of a power take off mechanism comprising means interposed between the drive shaft and the rear axle for disconnecting the rear axle, universal joints at the ends of the said shaft, a clutch embracing the drive shaft, one portion of which is solid on the said shaft, a sub-frame pivoted to the vehicle chassis, at the horizontal swiveling point of the said universal joints, a counter shaft journaled on the sub-frame, and means for driving the counter shaft from the drive shaft when the clutch is engaged.

In testimony whereof I affix my signature.

WILLIAM J. FONE.